United States Patent [19]

Stapleton

[11] 4,113,215

[45] Sep. 12, 1978

[54] TILT MOUNTING HEADS

[75] Inventor: Harold Reginald Stapleton, Pakenham, England

[73] Assignee: W. Vinten Limited, Bury St. Edmunds, England

[21] Appl. No.: 757,933

[22] Filed: Jan. 10, 1977

[30] Foreign Application Priority Data

Jan. 17, 1976 [GB] United Kingdom ............... 01888/76

[51] Int. Cl.² ............................................. F16M 11/12
[52] U.S. Cl. ................................................... 248/183
[58] Field of Search ............... 248/183, 185, 184, 186, 248/178, 372, 378, 382, 392

[56] References Cited

U.S. PATENT DOCUMENTS

| 1,898,469 | 2/1933 | Tonsor | 248/183 |
|---|---|---|---|
| 2,532,122 | 11/1950 | Schroeder | 248/183 |
| 2,719,690 | 10/1955 | Zucker | 248/183 |
| 2,832,556 | 4/1958 | Jonson | 248/183 |
| 2,905,421 | 9/1959 | O'Connor | 248/183 |
| 2,998,953 | 9/1961 | O'Connor | 248/183 |
| 3,163,387 | 12/1964 | Thomas | 248/183 |
| 3,180,603 | 4/1965 | O'Connor | 248/183 |

Primary Examiner—Marion Parsons, Jr.
Attorney, Agent, or Firm—Larson, Taylor and Hinds

[57] ABSTRACT

A tiltable mounting for a camera or the like having a base member and a mounting pivotable thereon, wherein a pivotal spring acting on a pivoted cranked cam follower compensates for the moments of force produced by the action of the mounted camera, or like article, as it pivots on the base member about the vertical axis. The spring tension may be adjustable to suit different articles and the mounting may be fitted with fluid attachments in either, or both, pitch and yaw axes.

16 Claims, 4 Drawing Figures

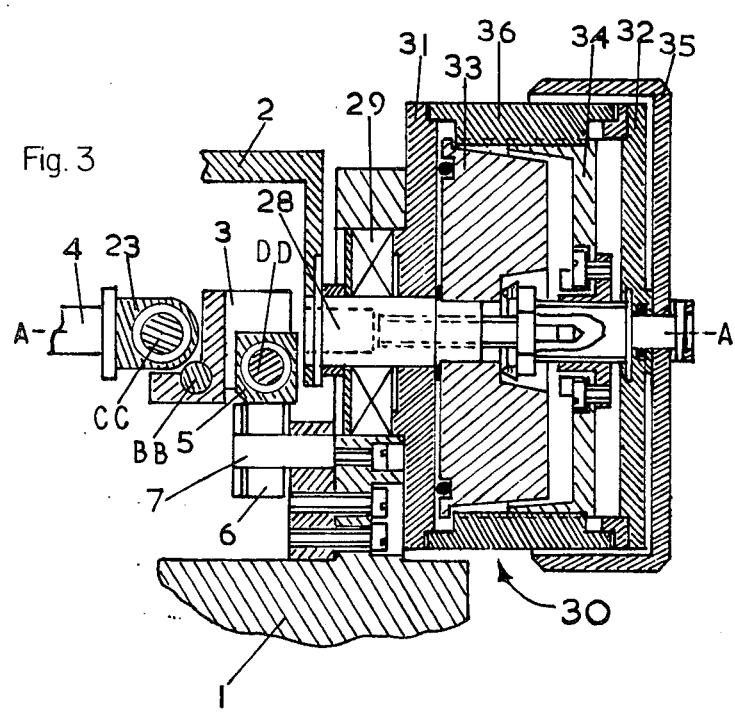
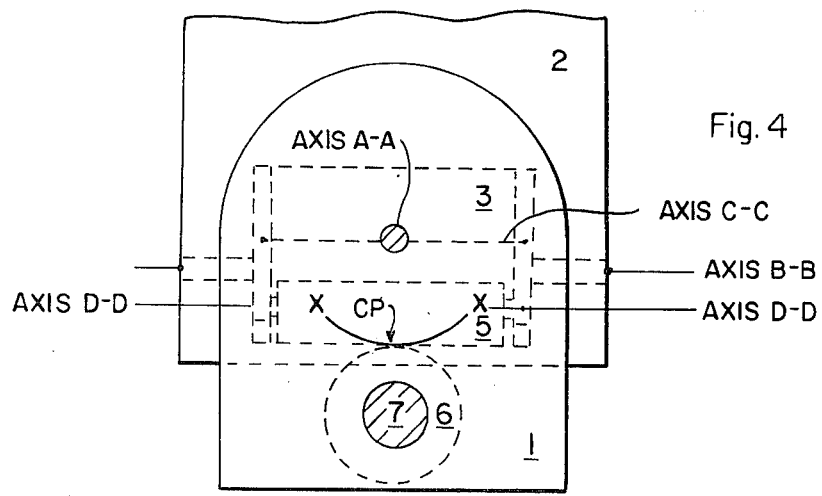

TILT MOUNTING HEADS

This invention relates to tilt mounting heads, and more particularly, though not exclusively, to light weight tilt mounting heads of the type utilizing spring pressures to counteract for the out of balance mass produced when the mounting head is tilted with such as a camera located on the mounting.

The problem of overcoming this out of balance mass has been tackled in many different ways. For example, mounting heads have been designed wherein the centre of gravity of the load, or camera as is more often the case, moves in a relatively straight line parallel to a horizontal guide. This has been achieved by various shapes and sizes of cams, and even systems of pulleys or springs. Another method of overcoming the out of balance mass has been the use of a variety of springs producing different counteracting pressures, so that the further the centre of gravity moves from the vertical point above the pivot, the greater the spring pressure applied. With these spring devices either an uneven movement has been achieved, causing a jerkiness of movement which is all too apparent on the picture, or spring fatigue has, after a short time in use, upset the initial balance of the mounting head, which, due to the size of the springs required, caused the mounting head to be comparatively large and unwieldly.

It is therefore an object of this invention to provide a compact mounting head wherein the out of balance mass of a camera, or the like, mounted thereon is counteracted for, and a smooth transition from a position of upward tilt to one of downward tilt is achieved.

It is also a known fact that the operators of these devices become accustomed to a certain "feel" when operating, so, even though the out of balance mass effect has been eliminated, and there is no sense of weight as the camera is tilted on the mounting, about the mounting head pivot point, a degree of feel, preferrably adjustable to suit individual requirements, may be applied. This feel, may take the form of a fluid drag coupling, wherein one part of the unit is fixedly attached to the rigid portion of the mounting head, and a second part of the unit is fixedly attached to the movable, or tiltable portion, with a suitable viscous fluid located therebetween, so that movement of the one part, relative to the other, causes a shearing action of the fluid and byadjustment of the two parts, relative to each other, the degree of drag, caused by the shearing action, may be regulated.

Tiltable mountings using only the fluid drag or shearing action of the fluid are known, but with these devices the main object is to obtain the same torque requirement on initial movement, as is required throughout the travel of the tiltable mounting. However, due to the out of balance mass of the load on the tilting member, the force required to move the load, as the centre of gravity moves from vertically above the pivot point, changes as the deviation from the point of balance varies, and hence the operator has to vary the degree of control.

It is therefore also an object of this invention to provide a compact mounting head wherein the out of balance mass of a camera, or the like, mounted thereon is counteracted for, and, wherein a fluid drag means may easily be fitted, so that the initial torque requirements for movement of the mounting in tilt are substantially the same as that required throughout the full degree of travel.

According to the invention we provide a tiltable mounting for an article, such as a camera or the like, comprising first means for pivotally mounting a tiltable support member on a base member, second means operably connecting said tiltable support member and said base member wherein said second means produces in operation a varying moment of force substantially equal and opposite to the moment of force produced when said tiltable support member with said article mounted thereon is tilted about said first means.

According to a further aspect of the invention we provide a tiltable mounting for an article, such as a camera or the like, comprising a base member having pivotally mounted thereon, a tiltable support member, a pivotal cam operable on a cam follower when said support member is tilted, to produce in conjunction with a spring a moment of force substantially equal and opposite to the moment of force produced by the action of said tiltable support member and said article, when tilted relative to said base member about the vertical.

According to a still further aspect of the invention, we provide a tiltable mounting for an article, such as a camera or the like, comprising a base member having pivotally mounted thereon a tiltable support member, a pivotal cam operable on a cam follower when said support member is tilted to produce in conjunction with a spring a moment of force substantially equal and opposite to the moment of force produced by the action of said tiltable support member and said article when tilted relative to said base member about the vertical, and fluid control means comprising at least one part on said base member and at least one further part on said tiltable support member wherein said fluid interacts with the parts to cause a fluid drag.

A preferred embodiment will now be described, by way of example only, in conjunction with the accompanying drawings.

FIG. 3 shows a cross section taken substantially along lines III—III of FIG. 1, with some parts removed or portions thereof cut away for clarity of an adjustable fluid attachment in the tilt plane.

FIG. 4 is a diagrammatic cross-sectional representation of an end view with parts removed of the tilt mounting head according to the invention showing the rotational axes in relation to the base member, the tiltable support member, the L-shaped block, the cam and the cam follower.

Figure 1:
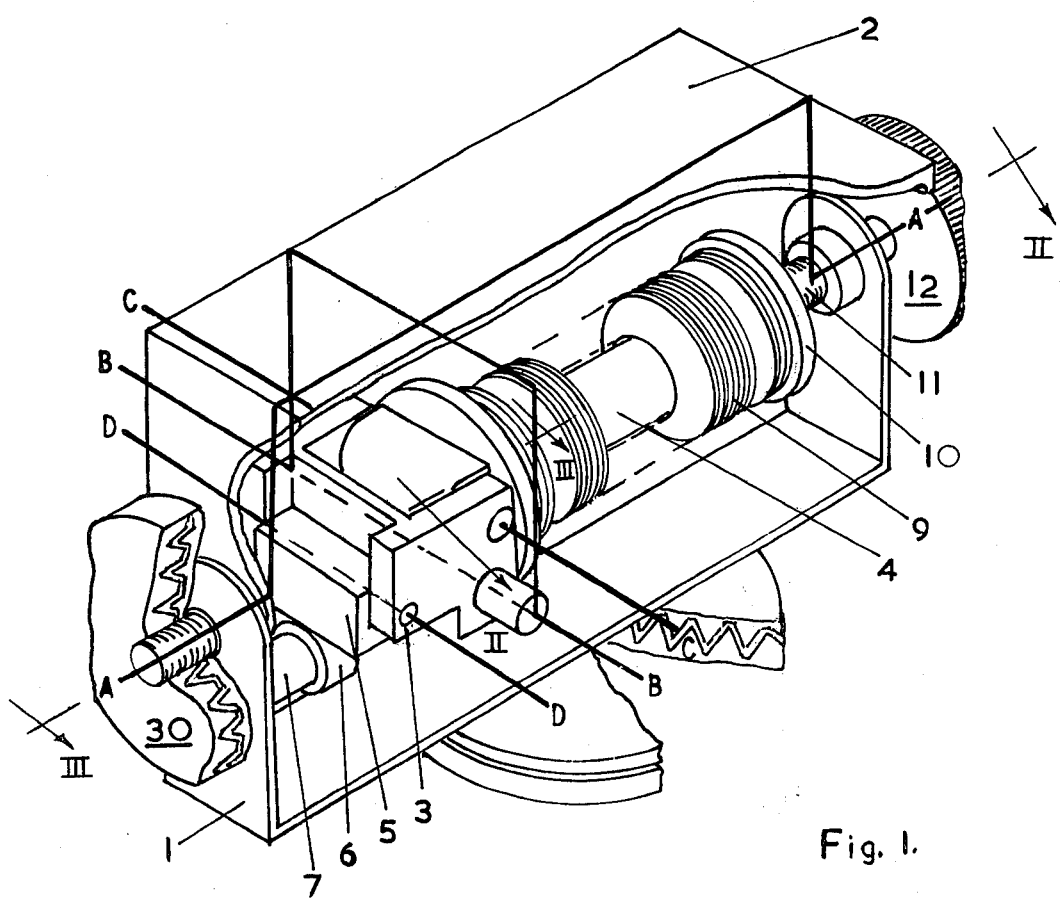
FIG. 1 shows a perspective view of the basis of a tilt mounting head according to the invention, wherein the bracket has been reduced in thickness and certain elements omitted for clarity of the invention.
Figure 2:
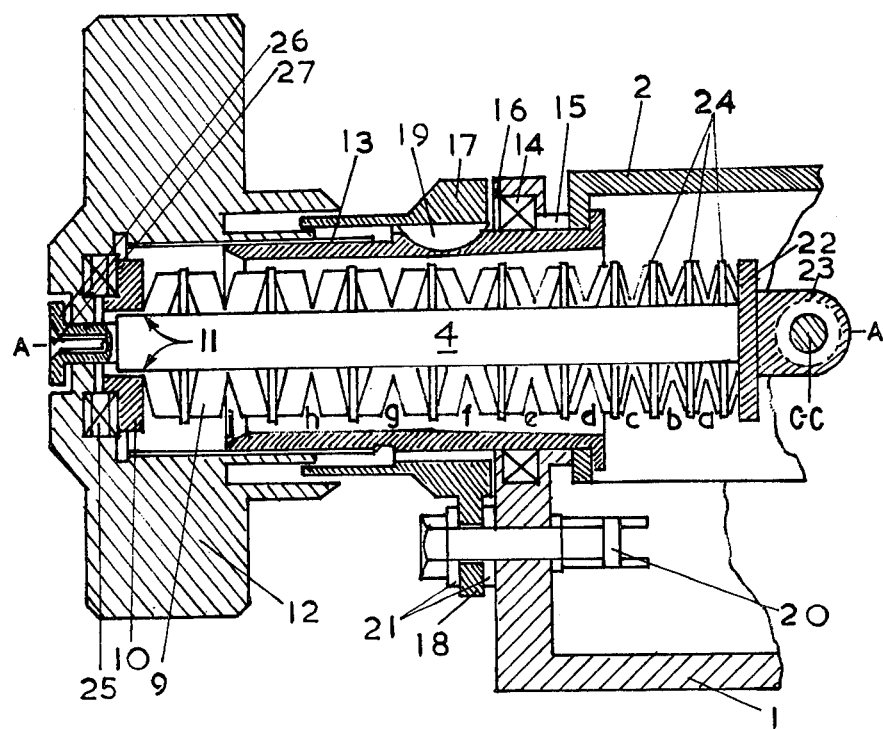
FIG. 2 shows a cross section taken substantially along lines II—II of FIG. 1, with some parts removed or portions thereof cut away for clarity of a preferred method for spring and compression means.

Referring now to FIGS. 1 and 4, a base member 1, which may preferably be a generally "U" shaped cast structure, has pivotally located on axis A—A, preferrably in tapered roller bearings not shown, a tiltable support member 2, preferrably a generally hollow boxlike structure which may also be a casting. Pivotally located within, and athwartships of, the tiltable support member 2, about axis B—B, is a block 3, of generally "L" shape, with a cut away centre portion to receive and have pivotally located therein, one end of a bar 4, pivoted about C—C. Attached to the block 3 is a substantially straight edge cam 5, which may have a generally blunt or knife edge, it may also be suitably shaped to more accurately produce counterbalancing forces and may be manufactured as a part of block 3, though preferably it is a separate item pivotable about axis D—D, but should preferrably be a hardened material, or at least have the operating edge case hardened. A cam follower 6, preferrably a roller bearing, or the like, located on a shaft 7 which may be attached to the base member 1, in any convenient manner, so that the cam and cam follower are in operative alignment. Located over the bar 4 and abutable against a shoulder thereon is a compression spring 9; of a pre-determined force related to the weight and centre of gravity of a camera or such article to be mounted on the tiltable support member; retained in a degree of compression by a shouldered bar 10, the bar of which may be slidably located within a longitudinally bored hole in bar 4 and the two bars may conveniently be pinned together to produce limited longitudinal movement, and thereby ease assembly within the base member 1. To counteract for possible lateral movement of the spring ends the two shoulders retaining the spring under a degree of compression may be recessed so that the end of the spring are trapped within their appropriate recess. A preferred method for spring and compression means is shown in FIG. 2, to be described later. For ease of construction the axis C—C lies on the axis A—A with the axis A—A bisecting the axis C—C so that a countersink, centrally located in the shouldered end of bar 10, may be pivotally located on a suitably shaped pivot 11 adjustably located on axis A—A within the pivotal mounting of the base member 1 for the tiltable support member 2. Longitudinal adjustment of the pivot 11 along axis A—A may then be achieved by turning knurled head 12, to increase or decrease the degree of compression of the spring 9 to adjust the basic setting for the moments of force required to counteract the moments of force produced as the load on the tiltable support member tilts about axis A—A.

The relationships between axes A—A, B—B, C—C, and D—D are the relative movements of tiltable support member 2, block 3, cam 5 and cam follower 6 can be summarized with respect to FIG. 4 as follows. Tiltable support member 2 rotates about axis A—A within base member 1. As tiltable support member 2 rotates, cam 5 will be rotated therewith about an arc X—X in contact with cam follower 6, at a point designated CP. Point CP will, in relation to cam 5, move across cam 5 and block 3 will tilt, or pivot, about axis B—B which, in turn, pushes axis C—C into the paper and down towards the base of member 1. This action results in clockwise rotation of block 3 about axis B—B as seen in FIG. 1.

Referring now to FIG. 2, wherein the previously used numerals represent like components, a preferred method of spring and compression means is shown. The tiltable support member 2 is extended by a shouldered, threaded tension sleeve 13 which is pivotally located by a bearing 14 in an upward extending end of the base member 1. A distance piece 15 axially locates base member 1 and tiltable support member 2 and may comprise shim material for adjustment. Bearing 14 may be located within the end of base member 1 by a circlip or like means 16. Located concentrically around the extension sleeve 13 is a further sleeve 17 having integral therewith a depending portion in the shape of a quadrant 18. The two sleeves 13 and 17 are rigidly connected together for example by a woodruff key 19. Quadrant 18 has a slot therein for receiving a brake 20 which can be used for controlling or governing the degree of tilt of the tiltable support member 2 or for locking the tiltable support member 2 in a desired position. Brake 20 comprises a bolt extending through the slot in quadrant 18 and through base member 1 and two brake pads 21 mounted thereon and located on either side of quadrant 18. Brake pads 21 compress against quadrant 18 and frictionally hold quadrant 18, and thus tiltable support member 2 in place. When the bolt is loosened, brake pads 21 permit quadrant 18 to rotate relative to the bolt. Bar 4 includes a shoulder 22 and bored extension 23 for pivotal location in block 3 of FIG. 1 on axis C—C. Preferably the spring 9 comprises a number of spring disc blocks *a, b, c, d*, —formed from spring discs in a series parallel arrangement with each block separated by a flat washer 24. The blocks *a, b, c, d*, - - - are preferably arranged to provide an increasing slope characteristic as they progress from the shoulder 22. The shouldered bar 10 of FIG. 1 is foreshortened and reversed to receive a roller bearing 25 or the like, and provide a pivotal abuttment for spring 9 on bar 4, preferably of a hardened metal, so that bar 4 may have longitudinal and lateral movement within the bore of 10 to provide the pivot 11. Knurled head 12 preferably a fairly substantial thumb and finger type control knob is threadably located over threaded tension sleeve 13 and when rotated clockwise compresses spring 9 via the roller bearing 25. A washer 26 and screw 27 affixed to the control knob end of bar 4 prevents control knob 12 from becoming separated from the threaded tension sleeve 13 when reducing the tension of spring 9.

In operation as the tiltable support member 2, with a load supported thereon, tilts about axis A—A, the cam follower 6 moves across the cam 5 thereby tilting the block 3 about axis B—B and rotating axis C—C about axis B—B. As axis C—C rotates about axis B—B the force produced at the point of contact of the cam and cam follower produces a moment of force substantially counteracting the moment of force produced as the centre of gravity of the load, located on the tiltable support member, is rotated either side of the vertical about axis A—A.

To provide a degree of feel and a substantially constant initial torque to the mounting when in operation, two or more plates, as basically shown in FIG. 1, having a viscous fluid therebetween, may be located on or about axis A—A between the base member 1 and the tiltable support member 2. These plates may be adjustable to vary their proximity and hence vary the degree of shear, and or drag, produced by the viscous fluid. The plates may also be mateably fluted or shaped to increase the shear area.

Referring now to FIG. 3, wherein the previously used numerals represent like components, and a cross section of an adjustable fluid attachment is shown fitted on an extended pivot on axis A—A, of the tiltable support member 2, there is also shown a cross section of the block 3 for clearer understanding of the reaction between cam, cam follower and spring to produce the counteracting moments of force required to balance a camera located on the tiltable support member, when pivoted about axis A—A. An extended pivot shaft 28 pivotal in the upward extending end of base member 1 via bearing 29 provides the operating shaft for a fluid drag unit 30, shown in basic principle on FIG. 1. Located about the extended shaft 28 and rigidly fixed to the upward extending end of base member 1 is a substantially cylindrical cup 31 having an end cap 32. Rigidly affixed about extended shaft 28 and rotatable therewith, is a first element or plate 33 of the fluid drag unit 30. A second element or plate 34, concentric with the first element and axially moveable along extended shaft 28 by a control knob 35 is prevented from rotation within the cylindrical cup 31 by one or more keys 36 located in the walls of the cylindrical cup. Relative axial movement between the two elements 33 and 34 determines the shear force required to overcome a fluid interacting between the two elements and movement of the tiltable support member 2 relative to the base member 1 provides the shear force and hence the degree of feel.

It will be obvious to those skilled in the art that many alterations to the basic design may be achieved without deviating from the invention. For example, the spring assembly, block and cam may be located other than on or parallel to axis A—A and the adjusting pivot 11 may be located elsewhere. The complete unit may be inverted so that the tiltable support member as described becomes the base member and vice-versa. Interchangeable spring assemblies may be utilised so that a larger range of loads may be accommodated.

Several variations may also be made to the basic fluid control which may be external of the base member, as shown, or within the confines of the tiltable support member, yet still provide the degree of feel and control required between the base member and tiltable support member when tilted about axis A—A.

The mounting as described may also be mounted for movement in pan or about the vertical axis and this pan axis may also be provided with a fluid drag unit such as shown in FIG. 3, so that the initial torque required to move the mount in pan is substantially the same as that required after the initial breaking forces have been overcome so that a smooth transition, from stationary to full movement, may be achieved. This fluid drag may also be adjustable.

A clamp may be located and secured on the tiltable support member for ease of mounting a camera, or the like, and the clamp may be adjustably positionable on the tiltable support member so that optimum positioning is easily attainable.

An operating arm may be attached to the tiltable support member so that control may be more easily achieved in both the pan and tilt axis, or alternatively a separate operating arm may be attached for the pan axis.

To further clarify the invention the following specific example of an embodiment of the invention is incorporated.

To obtain a high degree of accuracy using a simple compression spring the spring 9 is compressed by a pre-determined amount in the initial stages and the compression thereafter, due to operation of the mounting is a proportion of the initial compression. In a particular example a spring having a rate of 200 lbs per inch has a free length of six inches. The spring is operated at a basic working length of four inches which gives a pressure of 400 lbs. The crank moves through an angle of 20.5° and compresses the spring by 0.150 inches for an angular tilt of the mounting of 50 degrees from the vertical, which produces a further 30 lbs of pressure in the spring, i.e. a 7% increase in pressure. However, the angle between the crank and adjustable end of the spring is 21.5°, i.e. 20.5° of movement on block 3 and 1° of movement of the crank end of spring 9 off centre, for a 50° tilt of the mounting. Therefore the turning moment on the crank, i.e. pressure applied by cam 5 to cam follower 6, is 430 lbs multiplied by cosine of 21½ degrees which is, 430 × 0.930 or 400 lbs. This case is particularly suitable, and was calculated, for a load of 16 lbs having its centre of gravity 10 inches above axis A—A or any combination of load wherein the product of weight and height of centre of gravity is 160 lbs ins. With this type of spring only small variations in the height of the centre of gravity above the axis A—A may be obtained. By utilising a suitable combination of spring discs in series parallel, as in FIG. 2, a greater range in the height of the centre of gravity above the axis A—A may be obtained, as the rate of the spring is then dependent on the selected combination and the degree of compression.

It will also be apparent to those skilled in the art that the equivalent effect may be produced by maintaining the spring pressure constant and varying the length of the arm, beam or crank as the case may be to produce the required counterbalancing moment of force.

I claim as my invention:

1. A tiltable mounting for an article, such as a camera or the like, comprising
   first means for pivotably mounting about a first axis a tiltable support member on a base member, and
   second means operably connecting said tiltable support member and said base member wherein said second means comprises a spring loaded cam operable on a cam follower which produces in operation a varying moment of force substantially equal and opposite to the moment of force produced when said tiltable support member with said article mounted thereon is tilted about said base member.

2. A tiltable mounting as claimed in claim 1 wherein said second means further comprises gimballed means for pivotably mounting said cam.

3. A tiltable mounting as claimed in claim 1 wherein said spring loading comprises a pivotally located pretensioned compression spring.

4. A tiltable mounting as claimed in claim 1 wherein the spring is adjustable to provide for different ranges of varying moments of force.

5. A tiltable mounting as claimed in claim 1 wherein said second means further comprises a mounting block pivotally mounted to and pivoted with said tiltable support member about a second axis that is substantially perpendicular to said first axis, one of said cam and cam followers being mounted to said mounting block.

6. A tiltable mounting as claimed in claim 1 wherein said spring loading comprises a pivotally located number of spring disc blocks formed from spring discs in a series parallel arrangement.

7. A tiltable mounting as claimed in claim 6 wherein said spring disc blocks are arranged to form a spring having a variable slope characteristic.

8. A tiltable mounting as claimed in claim 1 having a fluid attachment for providing a resistance to initial movement equivalent to the resistance to continual movement in the tilt axis.

9. A tiltable mounting as claimed in claim 8 wherein the fluid attachment comprises two or more relatively contrarotatable juxtaposed plates coupled by an interacting fluid.

10. A tiltable mounting as claimed in claim 9 wherein the interacting fluid of the juxtaposed plates is variable in thickness by movement of at least one of said plates along the axis of rotation.

11. A tiltable mounting as claimed in claim 1 having a fluid attachment for providing a resistance to initial movement equivalent to the resistance to continual movement in the pan axis.

12. A tiltable mounting as claimed in claim 11 wherein the fluid attachment comprises two or more relatively contrarotatable juxtaposed plates coupled by an interacting fluid.

13. A tiltable mounting as claimed in claim 12 wherein said cam is pivotally mounted to said tiltable support member about a third axis that is substantially parallel to said second axis.

14. A tiltable mounting as claimed in claim 12 wherein said spring loading comprises a pre-tensioned compression spring mounted substantially about said first axis and compressible therealong, and wherein said second means further comprises a shaft for mounting said spring, means for pivotally mounting a first rearward end of said shaft to said mounting block at a forward end thereof about a fourth axis that is substantially perpendicular to said first axis, and means for mounting the second, forward end of said shaft for pivotal and longitudinal movement with respect to said base member.

15. A tiltable mounting as claimed in claim 13 wherein said second axis is located rearwardly of and below said fourth axis, wherein said fourth axis is located in close proximity to said first axis, and wherein said cam is pivotally mounted to said tiltable support member about a third axis that is substantially parallel to said second axis and located rearwardly of said second axis.

16. A tiltable mounting as claimed in claim 14 wherein said cam comprises an elongate, substantially straight edged cam and said cam follower is mounted directly below said first axis and in contact with said cam such that when said cam axis is substantially horizontal, said cam follower is located centrally of said cam.

* * * * *